United States Patent Office 3,291,525
Patented Dec. 13, 1966

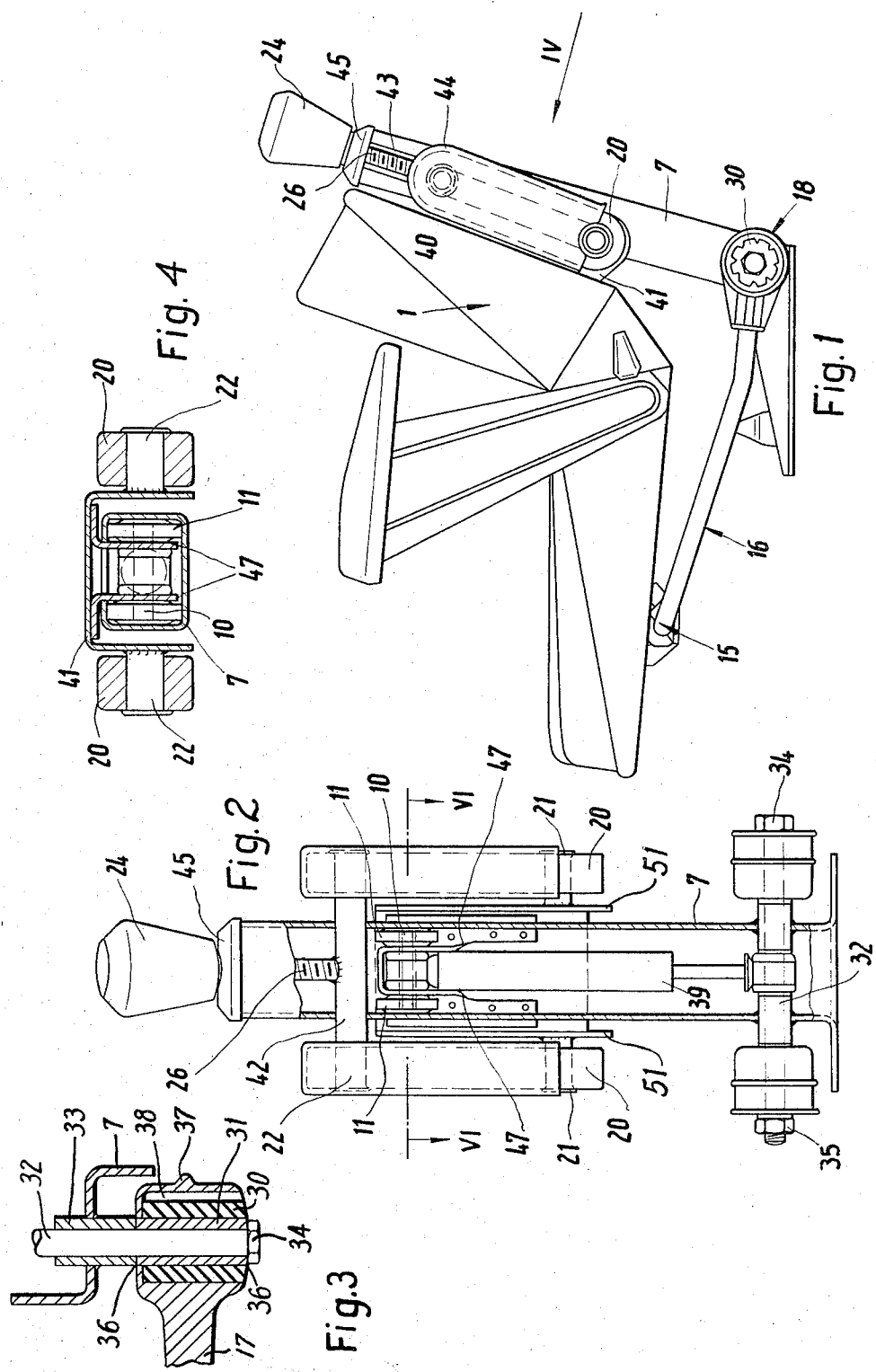

3,291,525
VEHICLE SEATS
Rupert Fritzmeier, Haus Nr. 14, Grosshelfendorf,
near Munich, Germany
Filed Oct. 18, 1965, Ser. No. 497,074
Claims priority, application Germany, Nov. 26, 1963,
F 41,371; Sept. 30, 1965, F 28,867
2 Claims. (Cl. 297—308)

This application is a continuation-in-part of Serial No. 361,056, filed April 20, 1964, now abandoned.

The invention relates to a vehicle seat for use in mobile heavy duty vehicles such as tractors comprising a back rest portion guided on the rear with rollers in a rearwardly inclined fixed guide column of U- or C-shaped cross section opening towards the back rest portion, and a seating pivoted in the front area at the bottom on one of the ends of at least one swing lever being with its other end in pivotal connection with the vehicle, wherein for resilient support of the seat the back rest portion and the guide column are connected by means of tension springs the one end of which being mounted for tension adjustment to a tensioning member adjustably supported on a lead screw that is affixed to the guide column.

It has been known to provide vehicle seats of this type in which the points of attachment of the tension springs on the back rest are approximately level with the points of attachment of said springs on the guide column under the condition of the seat being in its unloaded position. The tension springs such as elongated rubber rings will therefore occupy an approximately horizontal position with the seat being unloaded. The lead screw also extends in the direction of said tension springs on which the tensioning member supporting one of the ends of the tension springs is adjustable for pre-tension.

The known arrangement of the tension springs and the lead screw have not provided satisfactory results. Upon downward movement of the seat the elastic deformation of the tension springs is relatively small as compared to the length of the executed seat movement. In other words, the entire load on the seat has to be compensated in a small spring deformation. This, in turn, can be realized only with comparatively large springs resulting in a very hard support. In such spring arrangements differences in weight of the individual drivers can hardly be efficiently compensated by spring tension adjustment; all that is achieved is that the tension springs become harder as a function of increasing the stress; since, if the pre-tension is increased by moving the tensioning member outwardly along the lead screw, the tension springs will acquire a position which is still more even resulting upon equal seat movements in a smaller deformation, still.

Furthermore, with the position of the tension springs being only slightly inclined, the guide rollers are pressed hard against their guide in the guide column resulting in considerable frictional loss and, in addition, detrimental wear.

It is an object of the invention to markedly increase the springing comfort of a seat as described above.

This object has been achieved by arranging the points of attachment of the tension springs at the back rest portion approximately level with the junction of back rest and seating portion, and the lead screw approximately parallel to the guide column.

The thus achieved arrangement greater inclination of the tension springs, now being substantially parallel to the guide column, assures a considerably greater spring deformation upon equal seat movements of the inventive and the known seats with the result that smaller dimensioned tension springs can be used providing a softer springy action. Moreover, almost the entire spring resistance is used to take up or compensate the load on the seat leaving only a relatively small portion that is responsible for efficient guiding and close contact of the guide rollers with the guide column. Thus possible wear of the guide members and frictional loss are greatly reduced.

Furthermore, arranging the lead screw substantially parallel to the guide column is an advantage for changing pre-tension. Adjusting the tensioning member along the lead screw influences the spring force and also the spring deformation relative to the movement of the seat. Increasing the pre-tension, i.e., raising the tensioning member, increases the degree of inclination of the tension springs wherein for equal seat movements a greater spring deformation is necessary. In other words, even with increased pre-tension a softer springy action is ensured. Moreover, the accessibility of the lead screw for adjustment of the tensioning member has been improved in that, e.g., the lead screw no longer extends to the rear which is annoying and might have been the cause of injuries.

An even more compact arrangement is achieved by housing the lead screw supporting the tensioning member, and the tensioning member itself in the guide column wherein the tension springs either engage the tensioning member inside the guide column or at the periphery of said column which, in this instance, is provided with lateral slots serving to guide the tensioning member and through which the latter extends with its ends.

The tension springs can assume an even greater degree of inclination when the points of attachment of the tension springs at the back rest either extend into the guide column or when they are positioned at the periphery of said column on a U-shaped support bracket laterally embracing the guide column.

It is advantageous in the embodiments of the vehicle seat according the invention to journal the swing levers directly below at the foot of the guide column. Thereby more free space below the seat is attained and room is left for forming the swing lever somewhat longer, if desired, so that the front end of the swing lever executes a more parallel swinging movement with respect to the roller guide, thereby avoiding detrimental pressure.

It is also advantageous to have the swing lever bent proximate its connection with the guide column.

The invention is illustrated in more detail in the appended schematic drawings wherein, FIGURE 1 is a side elevation of a vehicle seat according to the invention, FIGURE 2 is a rear view of the seat according to FIGURE 1 along arrow IV wherein parts are shown in section and broken away, FIGURE 3 is a longitudinal sectional view of a mounting of a swing lever, FIGURE 4 is a sectional view along line VI—VI of FIGURE 2.

In a vehicle seat according to FIGURES 1 and 2 the upholstery carrying cup-shaped member 1 occupied by the driver is composed of a seating portion 3 and back rest portion 4 rigidly connected thereto to form one unit.

Behind back rest portion 4 of member 1 is provided a somewhat rearwardly inclined guide column 7 which is mounted to the vehicle floor (not shown) by means of a foot 8. Guide column 7 has a C-shaped cross-section open on that side which faces the cup-shaped member. The back portion of said cup-shaped member carries at its backside a bracket 41 of approximately U-shaped cross-section laterally embracing with its arms 51 guide column 7, wherein the arms are provided with pins 21 for mounting endless rubber rings 20 at both sides of column 7 for resilient support of member 1. A tensioning member carrying the other ends of the rubber rings has the form of a cross bar 42 guided in lateral slots 43 of the guide column. The ends of cross bar 42 extending through the guide column form the upper pins 22 for the rubber rings which can be partly covered by a cap 44, as illustrated.

Cross bar 42 is rigidly connected to lead screw 26 extending through an upper cover plate 45 of the guide column into a rotary knob 24. By rotating the knob, cross bar 42 may be raised or lowered, thereby changing the pre-tension of the rubber rings.

At the interior of the U-shaped bracket 41 mounted to the back portion 40 of the cup-shaped member 1, there are provided in spaced relationship two tongues 47 extending into guide column 7 and supporting with their ends a crosspiece 10 carrying guide rollers 11 at its end (FIGURES 2 and 4). In order to avoid escaping of rolls 11 in upward direction of the guide column, the latter is covered with the stop plate 45.

Member 1 is pivoted below in the front area at 15 to a swing lever 16 formed by a U-shaped bar whose connecting piece is arranged at pivot 15 and whose rearwardly and downwardly extending arms 17 are pivoted to the lower end of guide column 7, at 18 and being bent proximate their connection with the guide column.

The guiding arrangement of the seat thus consists in a combination of a swing lever arranged below the seat, and of a straight-line roller guide at the backside of the seat.

The resilient support of the seat is provided through tension springs in the form of endless elongated rubber rings 20, as mentioned, arranged on both sides of guide column 7 and substantially parallel thereto.

An additional spring arrangement is provided on pivot 18 of arms 17 of swing lever 16 arranged on the lower end of guide column 7. This arrangement is illustrated in more detail in FIGURE 3. It is composed of rubber torsion springs 30 vulcanized onto a sleeve 31. Sleeve 31 is mounted on a stationary axle 32, e.g. in the form of a through bolt 32 onto which the sleeve is clamped between a bushing 33 rigidly connected to guide column 7, and the head 34 of said bolt, or a nut 35, respectively (FIGURES 2 and 5), wherein both ends of said sleeve are provided with serrated washers 36 to ensure effective transmission of torque from the sleeve to guide column 7. Rubber spring 30 engages with its periphery an eye 37 of arm 17. The eye has on its inside axial ribs 38 to provide a non-slip connection between said ribs and the rubber spring.

If desired, rubber spring 30 may consist of another elastic material such as synthetic plastic material. Moreover, a helical coil spring acting as torsion spring may be incorporated. Another possibility is to incorporate a torsion spring of some kind into the front mounting of the swing lever, at 15.

The additional spring action of the mountings of the swing levers avoids high pressure causing friction which is present in cases where exclusively tension springs are used for resiliently supporting a seat. The pressure causing friction is converted by the elastical mounting to a deformation of the rubber rings, which, in turn, results in relieving the tension springs. Furthermore, the load of the swing levers in the form of pressure is converted in part to a load in the form of bending which relieves stress on the mountings of the swnig levers.

A telescopic-type shock absorber 39 is provided in the guide column, supporting with its upper portion at the crosspiece 10 and with its lower portion at the axle 32 to absorb vibrations of the seat.

In another embodiment (not shown) where guide column 7 is wider, the rubber rings may also be housed in said column resulting in bracket 41 extending with its pins 21 into the guide column and in the rubber rings being carried by the upwardly arranged cross bar 42 inside said column. It is understood that in the illustrated seats the rubber rings may be replaced for instance by coil springs.

Guide column 7 includes a foot 8 which is somewhat elongated towards the front and which supports a rubber cushion 50 avoiding hard impacts on the seat upon heavy jolts under adverse conditions.

I claim:

1. A vehicle seat in particular for use in mobile heavy duty vehicles such as tractors, said seat being guided for straight-line up and down movement at the backside by means of rollers disposed in a fixed rearwardly inclined guide column of C-shaped cross section opening towards the back rest portion of the seat and being pivoted at its bottom side, in front, to one of the ends of a swing lever, the other end thereof being in pivotal connection with the foot of the guide column, wherein tension springs are provided for resilient support of the seat, said springs being with one of their ends connected to the seat in the proximity of the junction of seating portion and back rest portion of the seat and transversely upwardly to a tensioning member being adjustable longitudinally to the guide column with the help of a lead screw mounted to the guide column and extending approximately parallel thereto, the arrangement being such that the tension springs assume a great degree of inclination under the condition of the seat being in its unloaded or unoccupied position.

2. A vehicle seat as defined in claim 7 wherein the swing lever is bent proximate its connection with said guide column.

References Cited by the Examiner
UNITED STATES PATENTS

| 1,765,757 | 6/1930 | Harris | 597—307 |
| 1,770,321 | 7/1930 | Mougeotte | 297—307 X |
| 1,929,023 | 10/1933 | Hickman | 297—304 X |
| 2,227,717 | 1/1941 | Jones | 297—302 |
| 2,629,427 | 2/1953 | McIntyre | 297—308 X |
| 3,139,304 | 6/1964 | Lehner et al. | 297—308 |

FRANK B. SHERRY, *Primary Examiner.*

G. O. FINCH, *Assistant Examiner.*